Nov. 9, 1926.
C. B. FOSTER
DEVICE FOR FORMING PLASTIC MATERIALS
Filed May 29, 1922 7 Sheets-Sheet 2
1,606,160
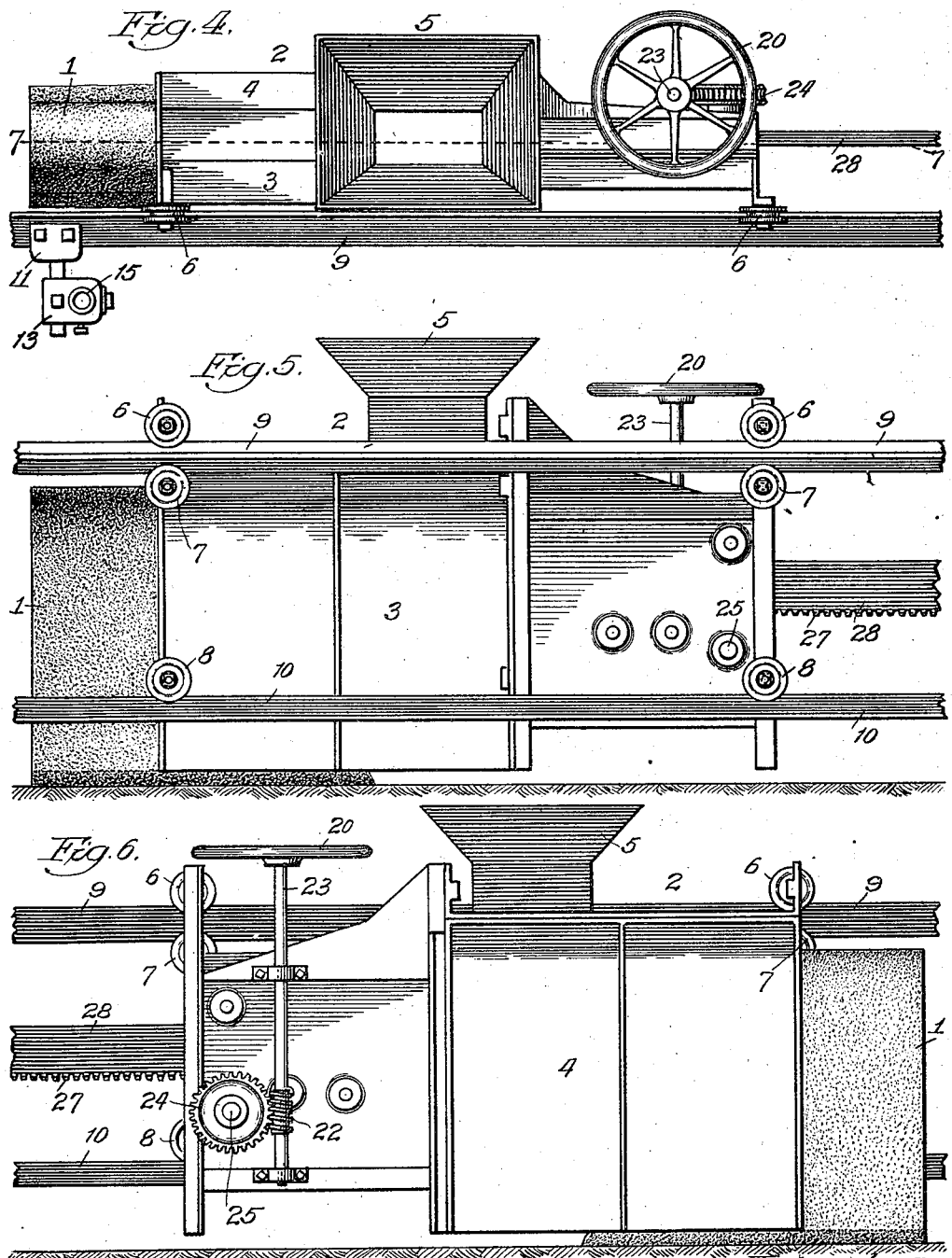

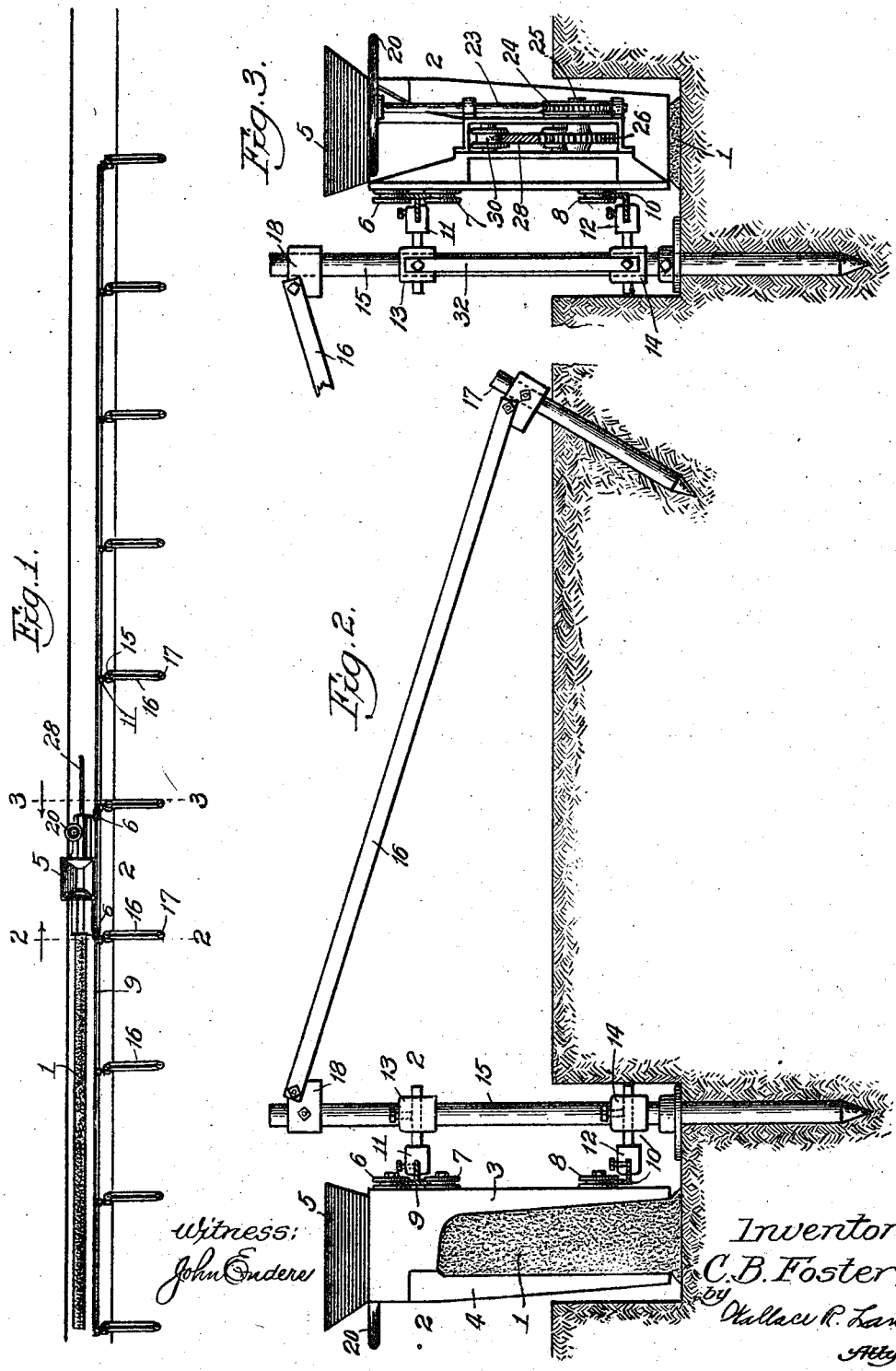

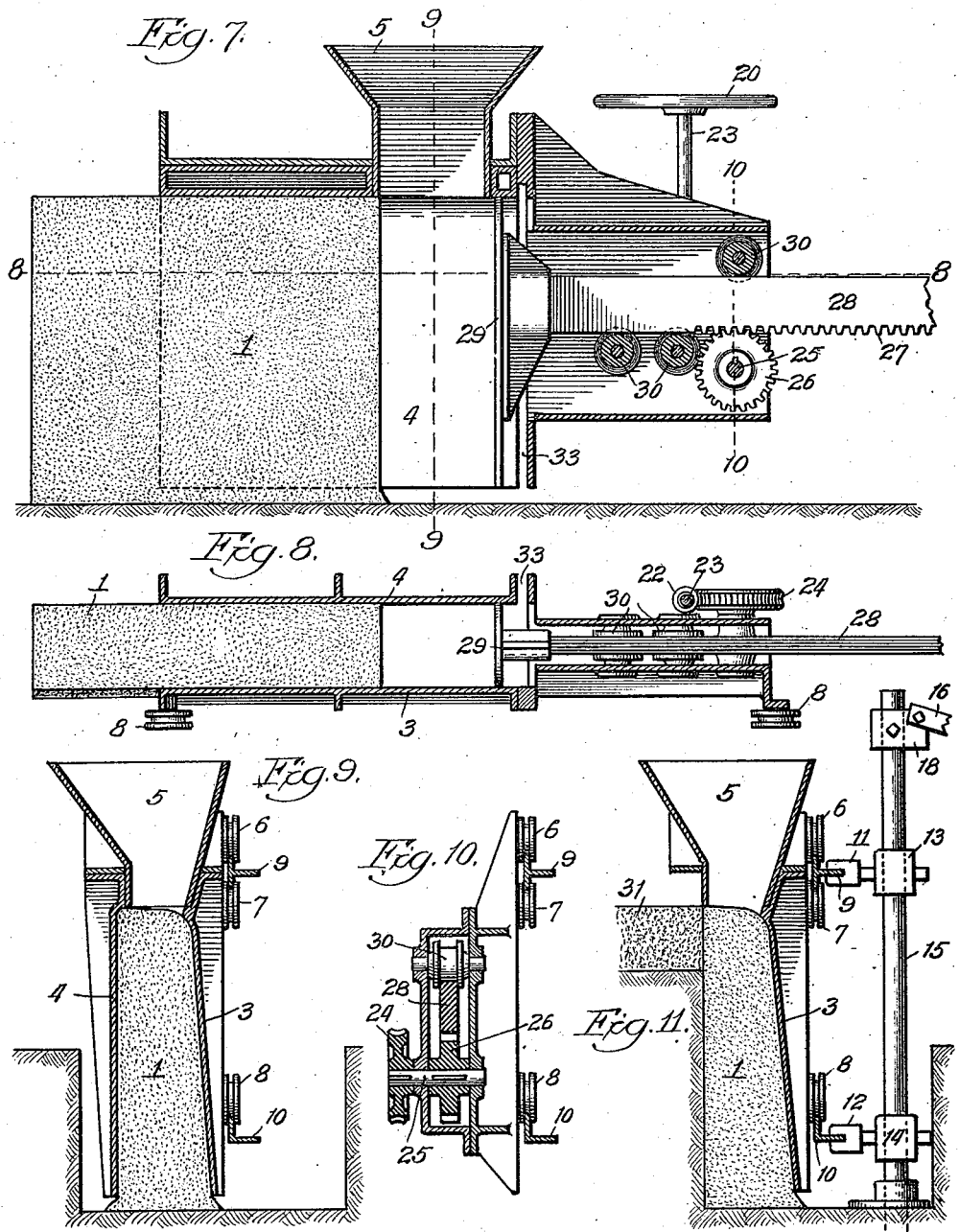

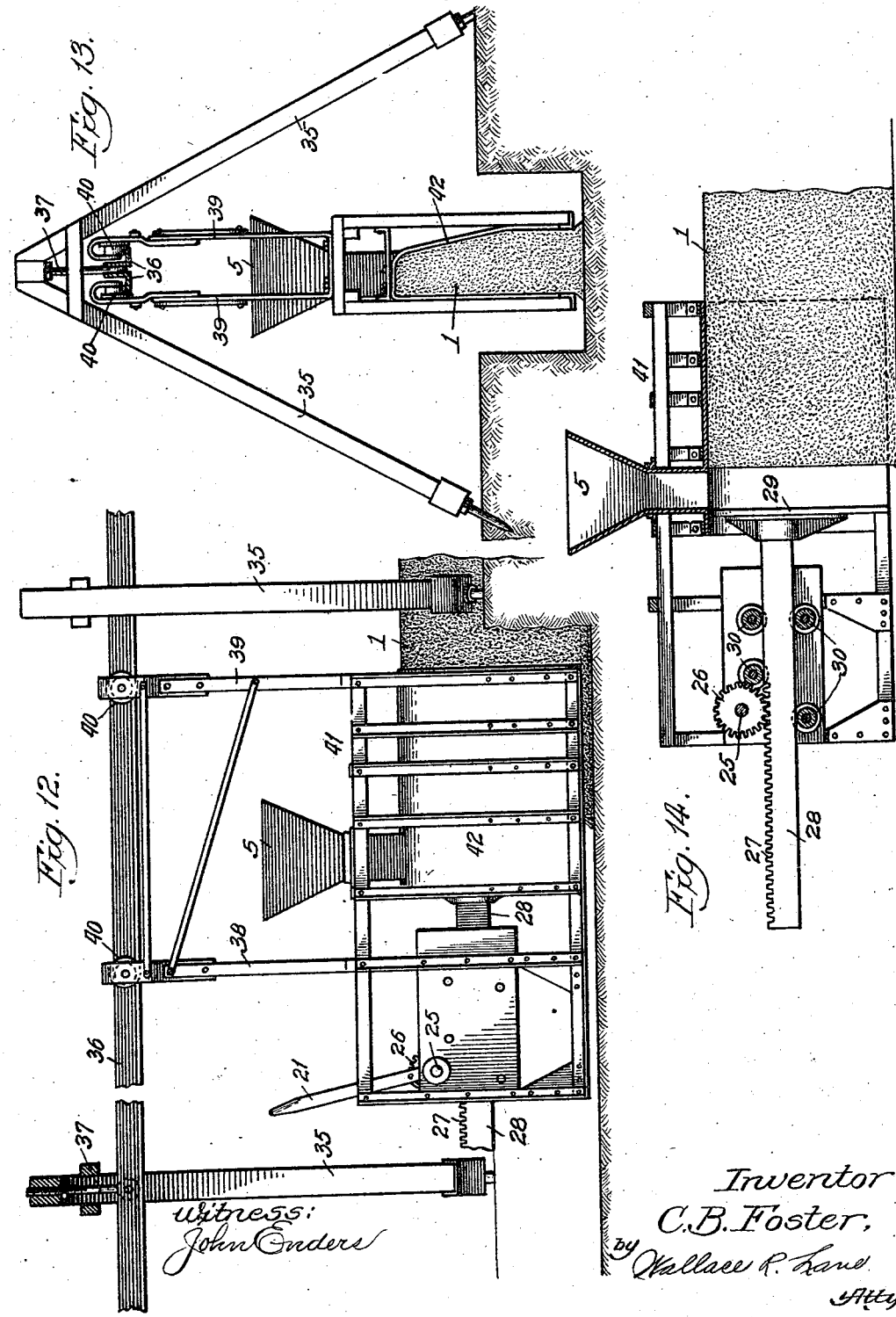

Nov. 9, 1926.
C. B. FOSTER
1,606,160
DEVICE FOR FORMING PLASTIC MATERIALS
Filed May 29, 1922    7 Sheets-Sheet 5
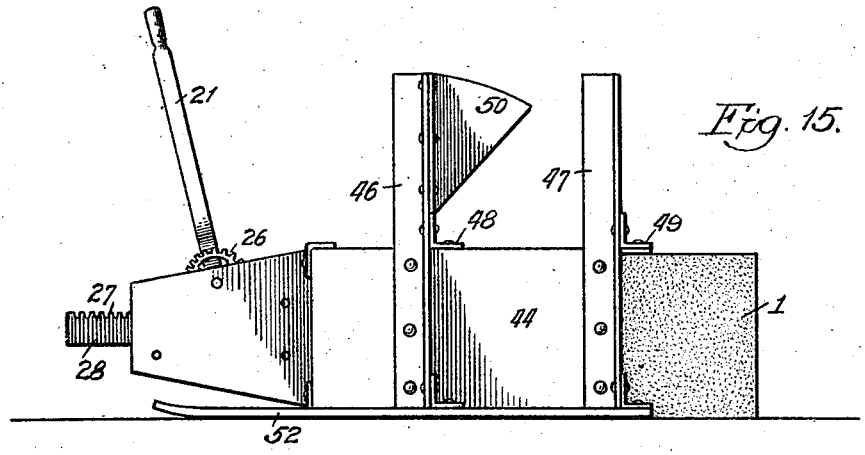
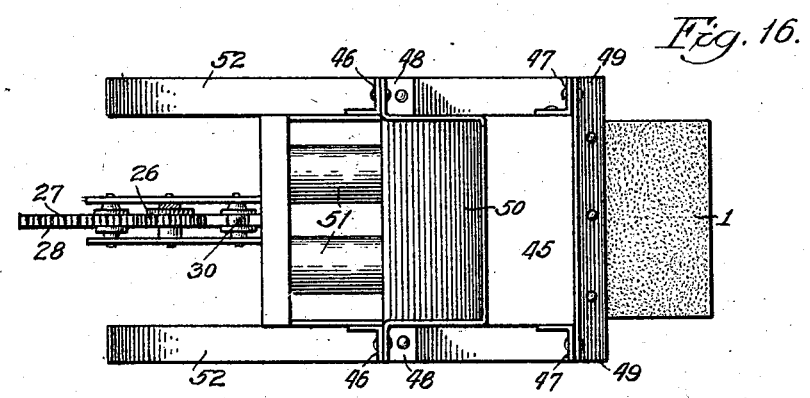
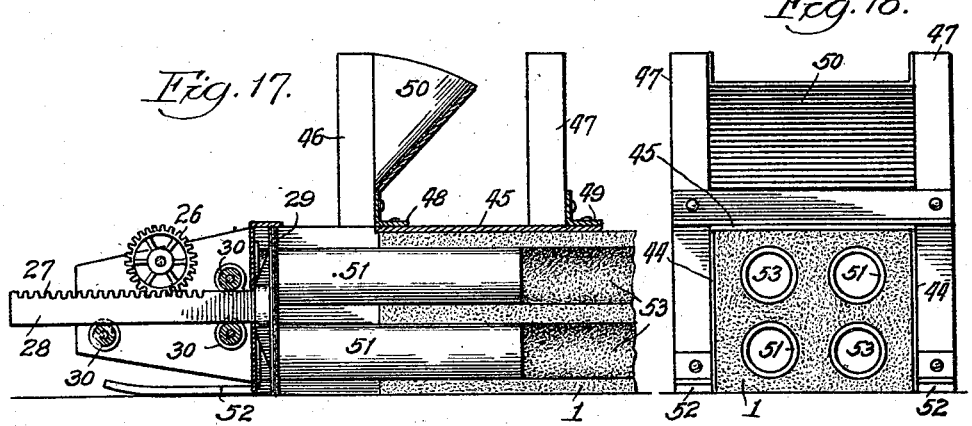
Witness:
John Enders
Inventor:
C. B. Foster,
by Wallace R. Lane
Atty.

Nov. 9, 1926.  
C. B. FOSTER  
1,606,160  
DEVICE FOR FORMING PLASTIC MATERIALS  
Filed May 29, 1922   7 Sheets-Sheet 6
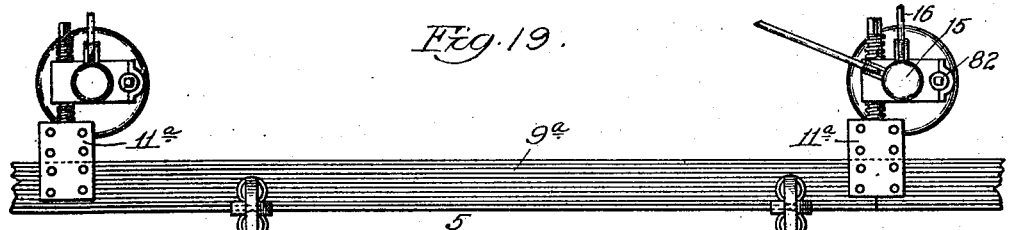
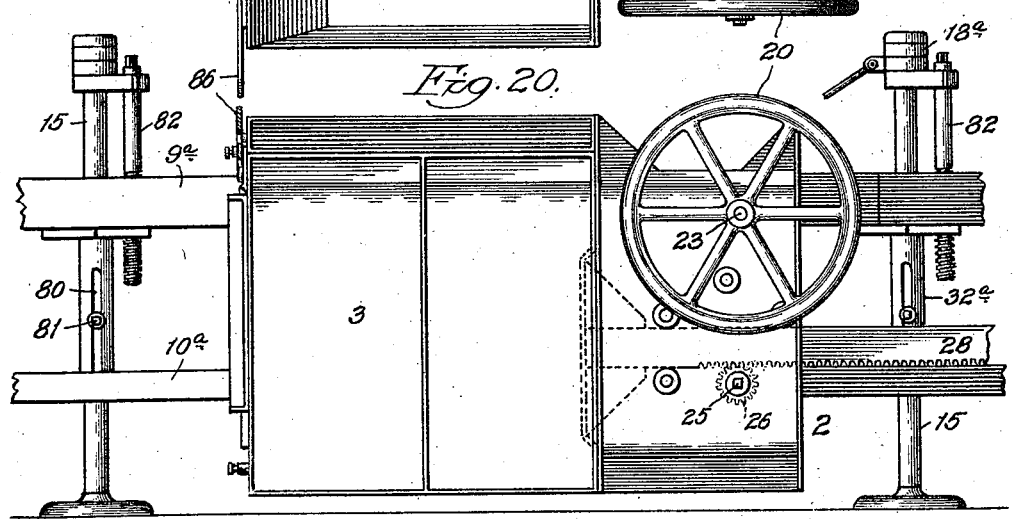
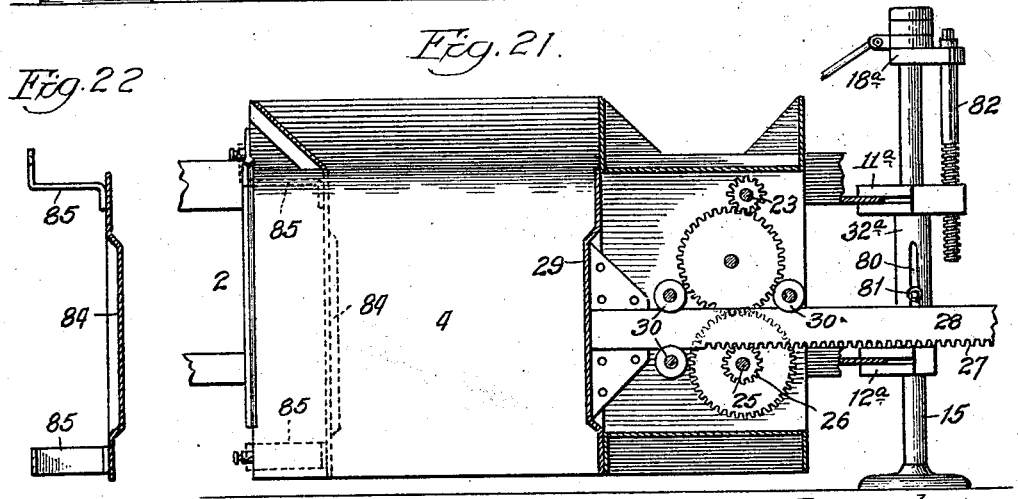

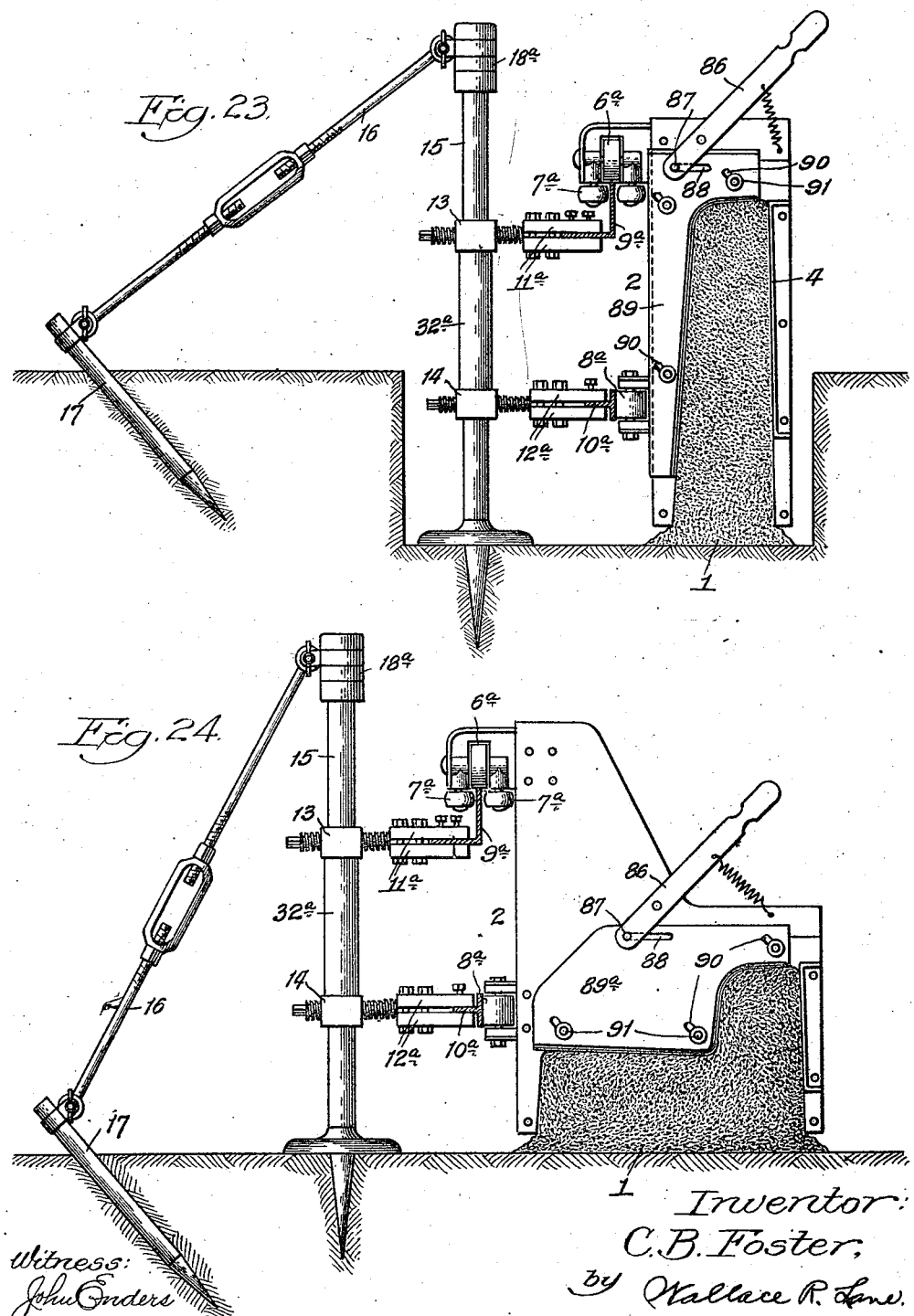

Patented Nov. 9, 1926.

1,606,160

UNITED STATES PATENT OFFICE.

CHARLES B. FOSTER, OF INDIANAPOLIS, INDIANA.

DEVICE FOR FORMING PLASTIC MATERIALS.

Application filed May 29, 1922. Serial No. 564,300.

My invention relates more particularly to the formation or shaping of cement and concrete structures such as curbs, conduits, walls, and the like, and among the objects thereof are the following: to provide an improved method of operating upon plastic material; to provide improved mechanism for forming or shaping plastic material; to improve upon mechanism of the character stated by so constructing it that the pressure used in forming shall gradually advance the machine to new positions wherein more plastic is to be formed; to provide a machine wherein a plastic may be formed continuously in position where it is to be used and may remain therein as the machine gradually advances to be in position to shape more plastic; and such further objects, advantages and capabilities as will later more fully appear.

My invention further resides in the combination, construction and arrangement of parts illustrated in the accompanying drawings, and while I have shown therein preferred embodiments, I desire the same to be understood as illustrative only and not as limiting my invention.

In the accompanying drawings,

Fig. 1 is a somewhat diagrammatic plan of mechanism for carrying out my new process in the making of a curb.

Fig. 2 is an end view of one form of mechanism used in the formation of a curb.

Fig. 3 is a similar view to that shown in Fig. 2 but showing the opposite end of the machine.

Fig. 4 is a plan view of the mechanism shown in Figs. 2 and 3.

Fig. 5 is a side elevation of the mechanism shown in Fig. 4.

Fig. 6 is an elevation of the opposite side of the machine from that shown in Fig. 5.

Fig. 7 is a fragmentary longitudinal section substantially along the plane indicated by the line 7—7, Fig. 4.

Fig. 8 is a longitudinal horizontal section substantially along the plane indicated by the line 8—8, Fig. 7.

Fig. 9 is a vertical transverse section substantially along the plane indicated by the line 9—9, Fig. 7.

Fig. 10 is a vertical transverse section substantially along the plane indicated by the line 10—10, Fig. 7.

Fig. 11 is a section similar to that shown in Fig. 9 but illustrating the machine in use in forming a curb against the edge of a sidewalk.

Fig. 12 is a side elevation of a modified form of my new curb forming machine.

Fig. 13 is an end view of the construction shown in Fig. 12.

Fig. 14 is a longitudinal section of the structure shown in Figs. 12 and 13.

Fig. 15 is a side elevation of a further modified form of my invention showing the same employed in the making of conduits for telephone wires and the like.

Fig. 16 is a plan view of the structure show in Fig. 15.

Fig. 17 is a longitudinal vertical section of the structure shown in Figs. 15 and 16.

Fig. 18 is an end elevation of this machine taken from the rear thereof.

Figs. 19, 20, and 21 are respectively a plan view, an elevation, and a longitudinal vertical section of another form of my invention.

Fig. 22 is a vertical section of an end member used as indicated by dotted lines in Fig. 21 to close this end of the machine for a purpose which will be disclosed later.

Fig. 23 is an end view of another form of my invention, showing the same in use as a curb forming machine.

Fig. 24 is an end view of still another form of construction, the same being shown in the act of forming a curb and gutter.

Referring more in detail to the annexed drawings, numeral 1 designates a plastic construction such as a cement or concrete curb, a conduit, or a wall, while numeral 2 denotes in general the machine for forming or shaping such structure. In the form of my device shown in Figs. 1 to 11, inclusive, numerals 3 and 4 designate a pair of side forming plates carrying a hopper 5 by means of which the plastic material may be fed into the space between the side plates 3 and 4. Plate 3 has pivotally mounted thereon a plurality of rollers 6, 7 and 8, adapted to engage tracks 9 and 10, removably secured in heads 11 and 12, which are adjustably carried by blocks 13 and 14. These blocks are carried, preferably adjustably, by posts 15 which may be inserted into the ground as shown most clearly in Figs. 2 and 3. Stay members 16 are pivotally and adjustably connected to posts 15 and stay posts 17 so that when posts 15 are driven into the ground to the desired depths and stay posts 17 are driven down in proper position the block 18 may be adjusted along post 15 to true the same up into a truly vertical position. If the posts 15 have not been placed absolutely in alignment, tracks 9 and 10 may be adjusted toward or away from the posts until in proper position as is obvious from the drawings. The T-iron track 9 being engaged by both rollers 6 and 7 will serve to hold the forming machine against either upward or downward motion. Track 10 will also assist in preventing downward motion of the forming machine by reason of the fact that rollers 8 rest upon said track. It will therefore be evident that these tracks sustain the forming machine against lateral tilting, support the same at proper vertical height, and guide it in its longitudinal movement during the formation of the plastic structure.

Though the present device is shown in the act of forming curbs and conduits in trenches, it will readily be understood that the same may be used in the forming of plastic structures on the surface of the ground if the same is in proper condition to receive such structure. With the apparatus set up as shown in Figs. 1, 2 and 3, plastic material, such as cement or concrete mixture, is put into the hopper 5 and tamped down. The compacting apparatus is then actuated by suitable means, such as the hand-wheel 20 or lever 21 (see Figs. 3, 4 and 12). Worm 22, carried by shaft 23, which in turn carries hand-wheel 20, meshes with a worm-wheel 24 carried by a shaft 25. This shaft carries a gear-wheel or pinion 26 which meshes with a rack 27 on rack-bar 28. It will therefore be seen that as hand-wheel 20 is actuated rack-bar 28 is necessarily reciprocated forwardly and rearwardly to move the plunger 29 so that the plastic composition is compacted between the forming plates 3 and 4. It will be obvious that the lever 21 actuates the rack-bar 28 in a manner similar to that described above and that the same is provided with appropriate reversing mechanism so that the direction of actuation of the rack-bar 28 may be reversed as desired. It will be seen that in both of these forms suitable rollers 30 are provided to sustain and properly position the rack-bar in addition to reducing the friction as the same is reciprocated.

If it be desired to form a curb against the edge of a sidewalk already laid as shown at 31 in Fig. 11, the side 4 of the forming or shaping apparatus may be removed and the apparatus properly set up as heretofore described. If the apparatus is now operated as described above, the plastic structure 1 will be formed as shown in this figure, with the upper end resting tightly against the edge of the sidewalk. It will be recognized that this is merely another adaptation of the same device to a different set of circumstances of use. It will be seen from Fig. 3 that the heads 13 and 14 are maintained at the proper distance apart by a link 32. A slot 33 (Figs. 7 and 8) is provided in the forward portion of the former so that expansion joints can be provided for by the insertion of an appropriate partition member. It will of course be obvious that when such a member is to be inserted to form the expansion joint, the head 29 must be withdrawn to such a position that the member inserted will be pushed by the head against the plastic material.

By referring to Figs. 12, 13 and 14, it will be seen that there are other differences from the structure heretofore described besides those referred to in the foregoing description. In this structure, pairs of legs 35, joined at their upper ends, are supported over the place where the plastic material is to be formed and tracks 36 are suspended therefrom by means of bolts 37. Carried by the arms 38 and 39 of a suspending frame are rollers 40 which support the forming machine at the proper height above the ground and permit the same to be moved longitudinally as the plastic material is shaped and compacted.

Suspended from the hanger members 38 and 39 is a frame 41 which supports the rest of the structure at the proper height and in operative position. In this form the plates 3 and 4 are shown as replaced by a generally U-shaped forming member 42, though it will be understood that the same type of former as heretofore described may be used if desired. The mechanism heretofore described for actuating the plunger 29 is carried by this frame 41, as will be evident from Sheet 4 of the drawings. In this form there is no lateral sustaining member as was described above, the suspension of the mechanism from the track directly above the location of the plastic structure being relied upon to keep the apparatus moving in proper alignment.

Since the conduit does not need to be perfectly straight, the conduit forming machine shown in Figs. 15 to 18, inclusive, is not shown as provided with any lateral sustaining means. This structure comprises side and top forming members 44 and 45 secured to and held in place by frame members 46, 47, 48 and 49. Secured to the frame members 46 is a chute 50 which assists in getting the plastic material inside of the machine. When this plastic material is put into the machine it is tamped into position around and between the tube forming members 51 and, when the space is well filled, the handle 21 is actuated to cause plunger 29 to compact this plastic material within the spaces 44 and 45. When this plastic material is thoroughly compacted and incapable of being further compressed, further actuation of the plunger 29 causes the machine to be pushed forward away from the conduit, said machine sliding on its runners 52, which prevents the ground from being torn up as the machine advances. It will be understood that in this form of my construction the tube forming members 51 are carried by the head of the machine so that as the plunger 29 is retracted for the insertion of more plastic material and advanced to compact the same, it will slide over members 51. As the machine advances tubes 51 are drawn along, leaving behind them the formed channels 53.

In the constructions shown in Figs. 19 to 24, numerals 1, 2, 3, 4, 5, 13, 14, 15, 16, 17, 18, 23, 26, 27, 28, 29 and 30 designate structures which are either the same or so nearly the same in form as the corresponding structures in the preceding forms that the differences are negligible, while numerals $6^a$, $7^a$, $8^a$, $9^a$, $10^a$, $11^a$, $12^a$, $18^a$, and $32^a$ designate structures corresponding to like structures in the previously described forms but differing therefrom somewhat in shape. However, the functions are substantially the same.

In the forms shown in Figs. 19 to 24 connecting member $32^a$ is made in the form of a sleeve surrounding the post 15 and is provided with a slot 80 through which extends a bolt or pin 81 which serves to guide the upward and downward movement of the sleeve. This movement is caused by rotation of a screw 82 extending through an arm of block $18^a$ secured to bolt 15.

In Figs. 21 and 22 is shown a plate 84 which is supported by means of brackets 85 within one end of the machine to serve as a starting base against which the concrete may be compressed when beginning the formation of a concrete structure. It will of course be understood that a similar construction may be used in others of the forms of my invention described above. After the concrete within the machine has been properly compressed and shaped and cannot be further compacted, the bolts which hold plate 84 in place are removed and the machine will then move forward as described above, as more concrete is compacted into its final form.

For the purpose of making scores, marks, grooves or the like in the plastic material, and as shown most clearly in Figs. 19 to 24, a lever 86 is pivoted at the left end of the machine as shown in Figs. 19 to 24, this lever being provided with a pin 87 which extends through a slot 88 in a movable plate 89 or $89^a$. This plate is provided with a plurality of diagonal slots 90 through which extend pins 91. It will therefore be seen that as the lever 86 is actuated about its pivot pin 87 will move through slot 88 and cause plate 89 or $89^a$ to be moved to score or mark the plastic material, the slots 90 passing over pins 91 with the purpose of guiding the plate in its proper direction.

It is obvious from the foregoing description that in all of the forms of my apparatus described above there is a unity of function in that, in each case, plastic material is put into a machine and the machine is then operated to cause compacting of said plastic material and ultimately movement of the machine to a new position due to the compacting force.

It is of course understood that the specific description of structures and methods set forth above may be departed from without departing from the spirit of my invention as set forth in this specification and the appended claims.

Having now described my invention,
I claim:—

1. In a structure of the character described, supporting posts, tracks carried thereby at a predetermined height above the ground, plastic forming mechanism, rollers secured to one side thereof and cooperating with said tracks to support and sustain the forming mechanism in position for operation and capable of being moved along said tracks to new positions of use, and means for compressing plastic material in said forming mechanism.

2. In a structure of the character described, supporting posts, tracks carried thereby at a predetermined height above the ground, plastic forming mechanism, rollers secured to one side thereof and cooperating with said tracks to support and sustain the forming mechanism in position for operation and capable of being moved along said tracks to new positions of use, and means for compressing plastic material in said forming mechanism and forcing the forming mechanism to travel along said tracks to a new position of use.

3. In a machine of the character described, means for forming a plastic substance on a foundation, means on said foundation for sustaining and guiding the first named means, means associated with said first named means for compacting the plastic and, when the same is compacted, moving the forming means along the sustaining means, and means for adjusting said sustaining and guiding means relatively to said foundation.

4. In a device of the class described, the combination of a support adapted to be mounted on a foundation, plastic forming plates, means movably supporting said plates on the said support and means for compressing said plastic between the plates to render the same self sustaining, said last named means serving to advance the forming plates to a new position to form another section of the plastic.

5. A device of the character described, a support mounted on a foundation, means for adjusting said support both vertically and laterally, forming means movably supported and sustained on said support and adapted to form a plastic structure in position of use, and means for advancing the forming means to a new position gradually as the plastic structure is formed.

6. In a device of the character described, supporting means adapted to be mounted on a foundation, means for adjusting said supporting means relatively to said foundation, forming means movably supported and sustained thereby and adapted to form a plastic structure in position of use, and means for advancing the forming means to a new position gradually as the plastic structure is formed, said advancing means comprising mechanism whereby the plastic may be compressed into a solid mass.

7. In a device of the class described, a plurality of standards adapted to be adjustably mounted on a foundation, a longitudinal support horizontally carried by said standards, means for adjusting said horizontal support vertically on said standards, forming means adapted to form a plastic structure movable along said longitudinal support and sustained thereby, means for compacting the plastic and adapted to move said forming means along said support into new positions as the plastic is compacted.

8. In a structure of the character described, supporting posts, a track carried thereby, plastic forming mechanism supported on said track, and means for compressing plastic material in said forming mechanism and forcing the forming mechanism to travel along said track to a new position of use.

9. In a structure of the character described, supporting posts, tracks adjustably carried thereby at a predetermined height above the ground, plastic forming mechanism, rollers secured to one side thereof and co-operating with said tracks to support and sustain the forming mechanism in position for operation and capable of being moved along said tracks to new positions of use.

10. In a structure of the character described, plastic forming mechanism comprising a former having closed sides and open ends, a plunger movable between said sides, an extension secured to an end of said former, means carried by the extension for moving the plunger to compact the plastic and advance the forming mechanism, and means supporting said mechanism during its advancing movement.

11. In a plastic forming machine, means for externally shaping a body of plastic material, mechanism for compacting the said material within the shaping means, said mechanism including a plunger having a supporting member fixed to the plunger, means on said shaping means for slidably supporting said supporting member, an actuating mechanism for said supporting member, and plunger, said actuating mechanism effecting a gradual advancement of the forming machine after the plastic is formed and compacted.

12. In a plastic forming machine, means for externally shaping a body of plastic material, mechanism for compacting the said material within the shaping means, said mechanism including a plunger having a supporting member fixed to the plunger, means on said shaping means for slidably supporting said supporting member, actuating mechanism for said supporting member and plunger, said actuating means effecting a gradual advancement of the forming machine as the plastic is formed and compacted, and tube forming members carried by and movable with said plunger for forming continuous passages in the plastic material.

13. In a plastic forming machine of the character described, having a plastic forming body and mechanism connected therewith for compacting the plastic within the body, means secured upon one end of the body for placing a scoring upon the surface of the finished plastic and means mounted upon the body for actuating the scoring means.

14. In a mechanism of the character described, supporting mechanism, a plastic forming body supported and guided thereby, compacting mechanism carried by the body to compact the plastic within the body, a scoring plate secured slidably upon one end of the body and means attached to the body for actuating the scoring plate.

15. In a mechanism of the character described, means for forming, compacting, and surfacing plastic material, means for surface marking said material, means for actuating said surface marking means in marking direction, and means to automatically return said marking means to non-marking position.

In witness whereof, I hereunto subscribe my name to this specification.

CHARLES B. FOSTER.

Certificate of Correction.

It is hereby certified that in Letters Patent No. 1,606,160, granted November 9, 1926, upon the application of Charles B. Foster, of Indianapolis, Indiana, for an improvement in "Devices for Forming Plastic Materials," errors appear in the printed specification requiring correction as follows: Page 3, line 28, for the numerals "19 to 24" read *19 to 23;* lines 55 and 56, for the numerals "19 to 24" read *23 and 24;* line 57, for the numerals "19 to 24" read *19 and 20;* and that the said Letters Patent should be read with these corrections therein that the same may conform to the record of the case in the Patent Office.

Signed and sealed this 21st day of December, A. D. 1926.

[SEAL.]
M. J. MOORE,
*Acting Commissioner of Patents.*